United States Patent
Ling et al.

(10) Patent No.: US 8,773,606 B2
(45) Date of Patent: Jul. 8, 2014

(54) DISPLAY MODULE

(75) Inventors: Kuo-Nan Ling, Taipei (TW); Po-An Lin, Taipei (TW); Yung-Hui Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 233 days.

(21) Appl. No.: 13/171,479

(22) Filed: Jun. 29, 2011

(65) Prior Publication Data

US 2011/0317401 A1    Dec. 29, 2011

Related U.S. Application Data

(60) Provisional application No. 61/359,811, filed on Jun. 29, 2010.

(51) Int. Cl.
*G02F 1/1333* (2006.01)
*G02F 1/1345* (2006.01)

(52) U.S. Cl.
USPC ............................ 349/58; 349/149; 361/679.3

(58) Field of Classification Search
USPC ................................. 349/58, 149; 361/679.3
See application file for complete search history.

(56) References Cited

U.S. PATENT DOCUMENTS

| | | | | |
|---|---|---|---|---|
| 3,624,312 | A | * | 11/1971 | Koukal et al. ................. 381/174 |
| 5,805,249 | A | * | 9/1998 | Hasegawa et al. ............. 349/59 |
| 6,417,897 | B1 | * | 7/2002 | Hashimoto ..................... 349/65 |
| 7,170,741 | B2 | | 1/2007 | Cho et al. |
| 2002/0191138 | A1 | * | 12/2002 | Matsumoto et al. .......... 349/141 |
| 2004/0204024 | A1 | * | 10/2004 | Voth et al. ................... 455/550.1 |
| 2006/0125981 | A1 | * | 6/2006 | Okuda .......................... 349/110 |
| 2008/0303972 | A1 | * | 12/2008 | Han et al. ........................ 349/58 |
| 2010/0315570 | A1 | * | 12/2010 | Mathew et al. ................. 349/58 |

* cited by examiner

*Primary Examiner* — Michael Caley
(74) *Attorney, Agent, or Firm* — Jianq Chyun IP Office

(57) ABSTRACT

A display module including an electronic component and a panel module is provided. The electronic component is installed inside the display module. The panel module includes a first side and a second side, and the first side includes a glass module having an electro-conductive material and a display region, wherein the glass module includes an electronic component projection area and the electronic component projection area does not contain the electro-conductive material to prevent affecting the performance of the electronic component. The electronic component projection area is an area where the electronic component is projected on the panel module along a normal direction of the display region. According to a design requirement of the product, the electronic component may be fixed to a frame combined with the panel module or located in the glass module.

20 Claims, 7 Drawing Sheets

DISPLAY MODULE

CROSS-REFERENCE TO RELATED APPLICATION

This application claims the priority benefits of U.S. provisional application Ser. No. 61/359,811, filed on Jun. 29, 2010. The entirety of the above-mentioned patent applications is hereby incorporated by reference herein and made a part of this specification.

BACKGROUND OF THE INVENTION

1. Field of the Invention

The invention relates to a display module. Particularly, the invention relates to a display module including a glass module with partial area not containing an electro-conductive material.

2. Description of Related Art

Along with development of semiconductor devices and display techniques, electronic products are continually developed towards directions of miniaturization, multi-function and easy to carry. The commonly used portable electronic products include notebook computers, tablet computers and mobile phones, etc. Taking the notebook computer as an example, it is consisted of a host and a display device pivotally connected to each other. The user can close the host and the display device of the notebook computer to facilitate carrying around, and when the notebook computer is to be used, the display device is opened relative to the host to facilitate operation and viewing displayed images.

The display device of the notebook computer includes a housing and a panel module and a backlight module disposed in the housing. Generally, the panel module and the backlight module are fixed to a cover of the housing through screw-locking. In order to provide a space for screw-locking, the housing has to have a certain degree of thickness and screw holes have to be set at periphery of the panel module, so that the thinness of the display device and a display region thereof are limited.

SUMMARY OF THE INVENTION

The invention is directed to a display device, which has smaller thickness and larger display region.

The invention provides a display module including an electronic component and a panel module. The electronic component is installed inside the display module. The panel module includes a first side and a second side, and the first side includes a glass module having an electro-conductive material and a display region. A partial area of the glass module does not contain the electro-conductive material, and the partial area is an electronic component projection area on the panel module corresponding to the electronic component, so as to prevent influencing the performance of the electronic component.

In an embodiment of the invention, the electronic component is an antenna, a camera module or a microphone.

In an embodiment of the invention, the electronic component is disposed adjacent to the second side of the panel module or is located in the panel module.

In an embodiment of the invention, when the display module has a backlight source, the second side of the panel module includes a plurality of optical components, and the optical components include a light source, a reflector plate, a light guide plate and an optical film set, and the glass module contains a liquid crystal layer.

In an embodiment of the invention, a size of the glass module is not smaller than a size of any of the optical components.

In an embodiment of the invention, the electronic component projection area and the optical component are not overlapped on the panel module.

In an embodiment of the invention, when the display module does not have a backlight source, the glass module contains an organic light emitting layer.

In an embodiment of the invention, the electronic component projection area is an area where the electronic component is projected on the panel module along a direction, and the direction is a normal direction of the display region.

In an embodiment of the invention, the electro-conductive material is metal, electro-conductive polymer, conductive metal ink, or conductive metal oxide.

In an embodiment of the invention, a resistance of a component in the electronic component projection area is greater than $10^6$ ohm.

In an embodiment of the invention, the electro-conductive material of the electronic component projection area is removed through wet etching, dry etching or laser ablation.

In an embodiment of the invention, the glass module includes a first glass plate and a second glass plate, where a surface of the first glass plate and a surface of the second glass plate contain the electro-conductive material.

In an embodiment of the invention, the glass module is fixed to a first side of a frame, and a second side of the frame includes an electronic component assembling area for fixing the electronic component.

In an embodiment of the invention, the panel module covers the electronic component assembling area to form the electronic component projection area on the panel module, and the electronic component assembling area is overlapped with the electronic component projection area on the panel module.

In an embodiment of the invention, the display module is fixed to a cover through the frame, and the display module and the cover are combined to form a display device, and the cover is adjacent to the second side of the frame and the electronic component fixed to the electronic component assembling area is located between the cover and the frame.

In an embodiment of the invention, when the cover is fixed to the frame, a sidewall of the cover covers a sidewall of the frame to avoid light leakage of the display device.

In an embodiment of the invention, the display device further includes a trim strip located at periphery of the panel module for protecting the panel module, and a sidewall of the trim strip covers a sidewall of the frame to avoid light leakage of the display device.

In an embodiment of the invention, the frame includes a plurality of electronic component assembling areas and projections of the electronic component assembling areas along a direction are all covered by the electronic component projection area, and the direction is a normal direction of the display region.

In an embodiment of the invention, a distance between an edge of the projection area of the electronic component assembling area along a projection direction and an edge of the electronic component projection area on the panel module is greater than 5 mm, and the projection direction is a normal direction of the display region.

In an embodiment of the invention, the frame is an only structure substantially provide support to the panel module.

In an embodiment of the invention, the electro-conductive material of the electronic component projection area is not printed when the electro-conductive material was printed on the glass module.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
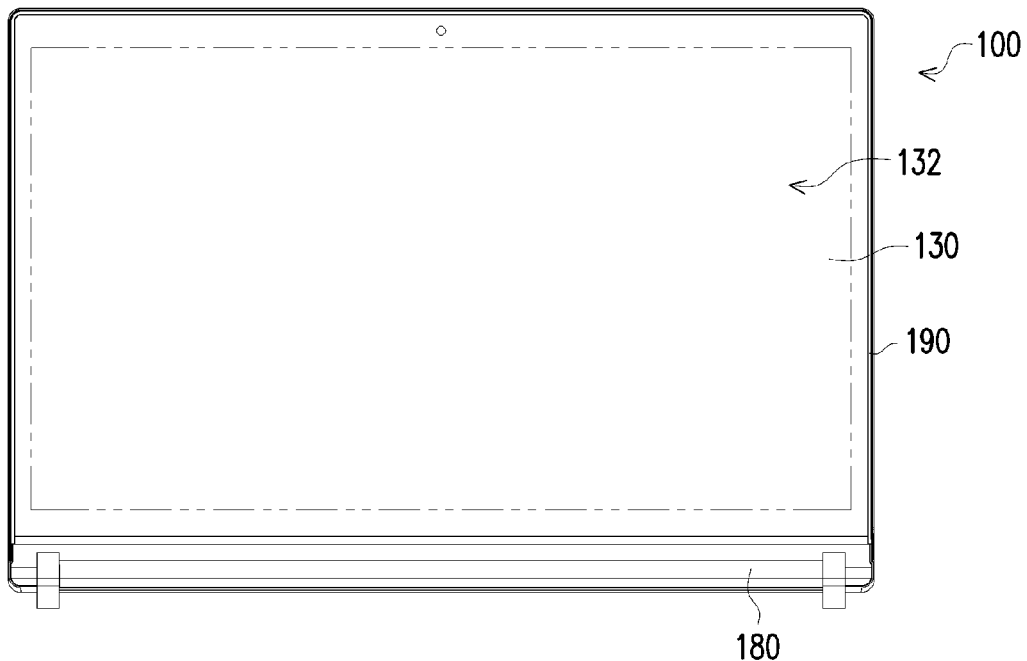
FIG. 1 is a front view of a display device according to a first embodiment of the invention.
Figure 2:
FIG. 2 is a rear view of the display device of FIG. 1.
Figure 3:
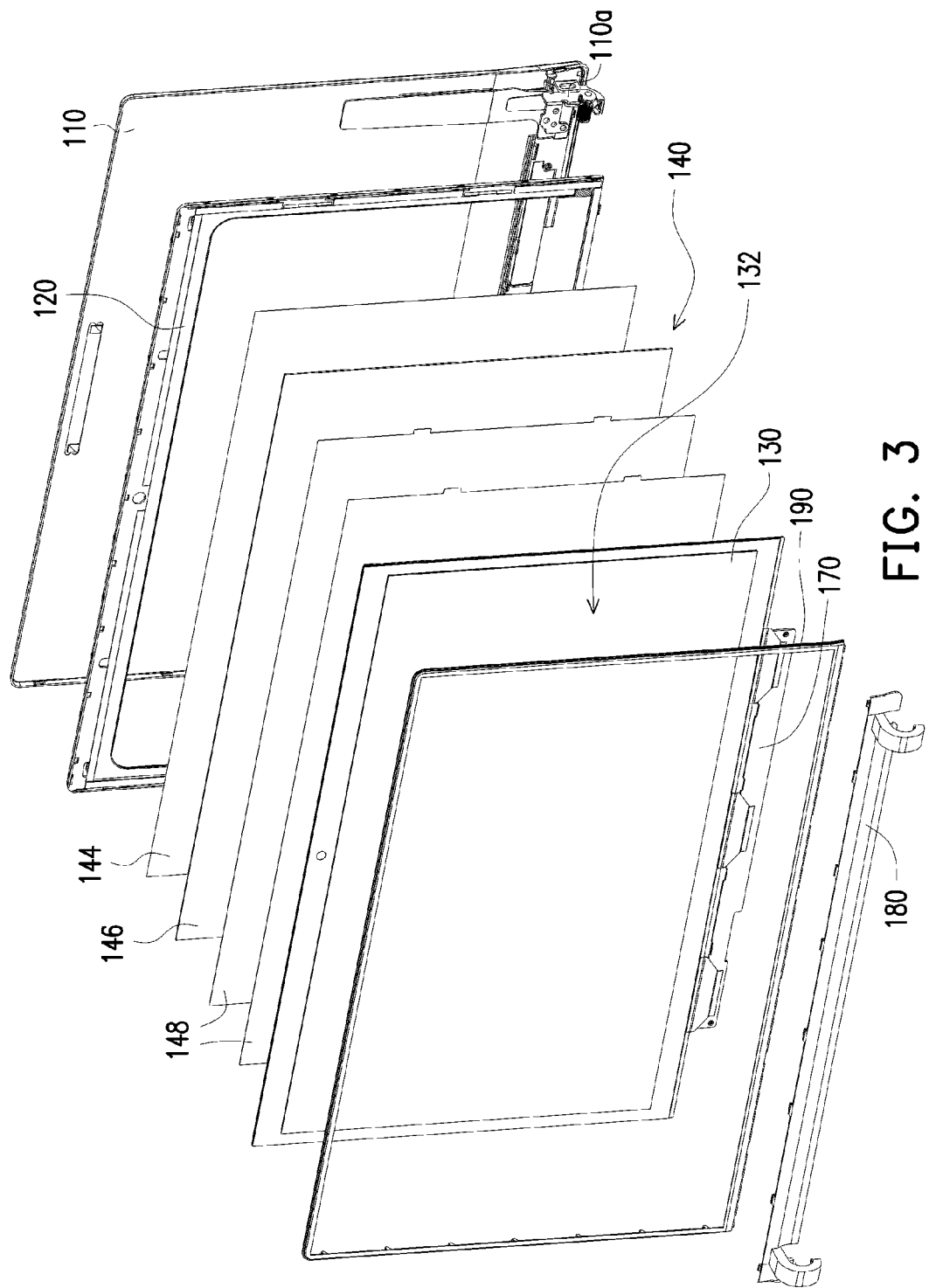
FIG. 3 is an exploded view of the display device of FIG. 1.

FIG. 1 is a front view of a display device according to a first embodiment of the invention. FIG. 2 is a rear view of the display device of FIG. 1. FIG. 3 is an exploded view of the display device of FIG. 1. The structure of the invention can be applied to a display device having a backlight source or a display device without a backlight source (a self-luminous display device), where the display device having the backlight source can be a liquid crystal display (LCD). The display device without the backlight source can be an organic light-emitting diode (OLED) display device. In the following first embodiment, the structure of the invention is applied to a display device having the backlight source, though the invention is not limited thereto. Referring to FIG. 1 to FIG. 3, the display device 100 of the first embodiment includes a cover 110, a frame 120 and a panel module, where the panel module includes a glass module 130 and a backlight module 140. The frame 120 can be fixed to the cover 110, and the panel module can be adhered to a first side of the frame 120 along a direction to form a display module, where the above direction is a normal direction of a display region 132 on the display module, and a size of the glass module 130 is not smaller than a size of the display region 132. When the display device 100 has a backlight source, the display module has the backlight source. The display device 100 of the first embodiment is, for example, applied to a notebook computer, and the display device 100 is pivotally connected to a host (not shown) of the notebook computer through a hinge 110a shown in FIG. 3 to form the notebook computer. In other embodiments, the display device 100 can also be applied to electronic devices such as a tablet computer, a mobile phone, and a television, etc.

Figure 4:
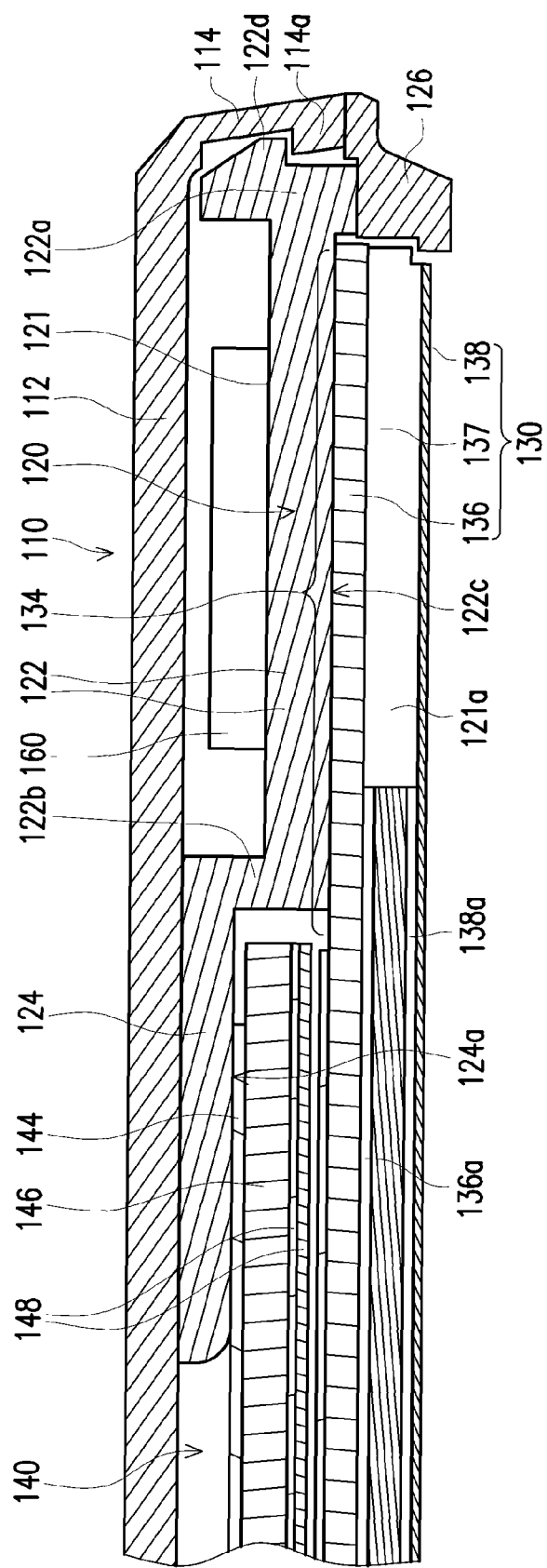
FIG. 4 is a cross-sectional view of a part of the display device of FIG. 1.

FIG. 4 is a cross-sectional view of a part of the display device of FIG. 1. Referring to FIG. 4, in detail, the cover 110 of the first embodiment has a base plate 112 and a sidewall 114, and the frame 120 has a supporting part protruded inward, and the supporting part includes a first supporting portion 122 and a second supporting portion 124. A first side 122a of the first supporting portion 122 is snapped to the sidewall 114 of the cover 110, and the second supporting portion 124 is connected to a second side 122b of the first supporting portion 122, and is leaned against or not leaned against the base plate 112 of the cover 110 according to a design requirement of the product. The glass module 130 is adhered to the first supporting portion 122 along a direction, and the backlight module 140 is disposed between the glass module 130 and the base plate 112, and is adhered to the second supporting portion 124 along the same direction, where the adhering direction of the glass module 130 and the backlight module 140 and the frame 120 is a normal direction of a display region 132 of the display module. According to a design requirement of the product, the first supporting portion 122 is located on the frame 120 at a position outer than that of the second supporting portion 124, so that the light of the light source can be totally transmitted to the glass module 130 through the backlight module 140. The frame 120 has an opening in the middle, and the light produced by the backlight module 140 can be fluently transmitted to the glass module 130 through the opening, so as to increase brightness of the display region 132. When the panel module is adhered to the frame 120, the frame 120 surrounds the periphery of the panel module and the panel module covers the opening to increase the brightness of the display region 132. Moreover, according to a different product design, the frame 120 may further include a stop portion 126 to prevent the glass module 130 from departing the first supporting portion 122, so as to further protect the glass module 130. When the frame 120 does not have the stop portion 126, the display device 100 of the embodiment further includes a trim strip 190, and the trim strip 190 surrounds the glass module 130, and is engaged to the frame 120 or the cover 110 to protect a glass plate of the glass module 130 from cracking due to impact. The glass module 130 includes a first side and a second side, where the first side of the glass module 130 is a first glass plate 136 and includes the display region 132 and is used to contact the stop portion 126 or the trim strip 190. The second side of the glass module 130 is a second glass plate 138 and is contacted or adhered to the backlight module 140. The panel module also includes a first side and a second side, where the first side of the panel module is the first side of the glass module 130 and includes the display region 132. The second side of the panel module is used to adhere to the frame 120, so as to combine the panel module and the frame 120 to form the display module. The first side and the second side of the panel module are planes parallel to each other.

According to the above configuration, when the frame 120 has the stop portion 126, the glass module 130 and the backlight module 140 of the panel module are all substantially securely affixed to the frame 120 by adhesion, and the frame 120 is snapped to the cover 110 and limits a position of the glass module 130 through the stop portion 126, so as to complete assembling the display module. Since the display module is not fixed to the cover 110 through screw-locking, the cover 110 is unnecessary to provide a screw-locking space, so that the whole structure may have a smaller thickness, and the display module may have a larger display region 132 (shown in FIG. 1 and FIG. 3) due to that configuration of screw holes is unnecessary. When the glass module 130 and the backlight module 140 of the panel module are substantially securely affixed to the frame 120 to from the display module by adhesion, the frame 120 is the only structure substantially providing support to the panel module. The display module and the cover 110 can be combined to form the display device 100 due to support of the frame 120.

In the first embodiment, a material of the first supporting portion 122 and the second supporting portion 124 is, for example, plastic having a cushion effect, which can provide support to the glass module 130 and the backlight module 140. A material of the stop portion 126 is, for example, rubber, which can be fabricated together with the first supporting portion 122 and the second supporting portion 124 through double injection molding to form an integral structure. A material of the cover 110 of the first embodiment is, for example, aluminium or other suitable electro-conductive materials. However, the invention is not limited thereto, and in other embodiments, the material of the cover 110 can also be plastic, and the cover 110 has integrally formed structural strengthening ribs or electro-conductive members used for improving a structural strength.

In detail, the first supporting portion 122 of the first embodiment has a first supporting surface 122c, and the second supporting portion 124 has a second supporting surface 124a. A distance between the first supporting surface 122c and the base plate 112 is greater than a distance between the second supporting surface 124a and the base plate 112. An orthogonal projection of a peripheral part 134 of the glass module 130 on the base plate 112 is not overlapped to an orthogonal projection of the backlight module 140 on the base plate 112. In this way, the glass module 130 and the backlight module 140 stacked to each other are respectively adhered to the first supporting surface 122c and the second supporting surface 124a, where the glass module 130 is adhered to the first supporting surface 122c through its peripheral part 134, and the adhesive used for adhering the panel module and the frame 120 includes an epoxy resin.

Figure 5:
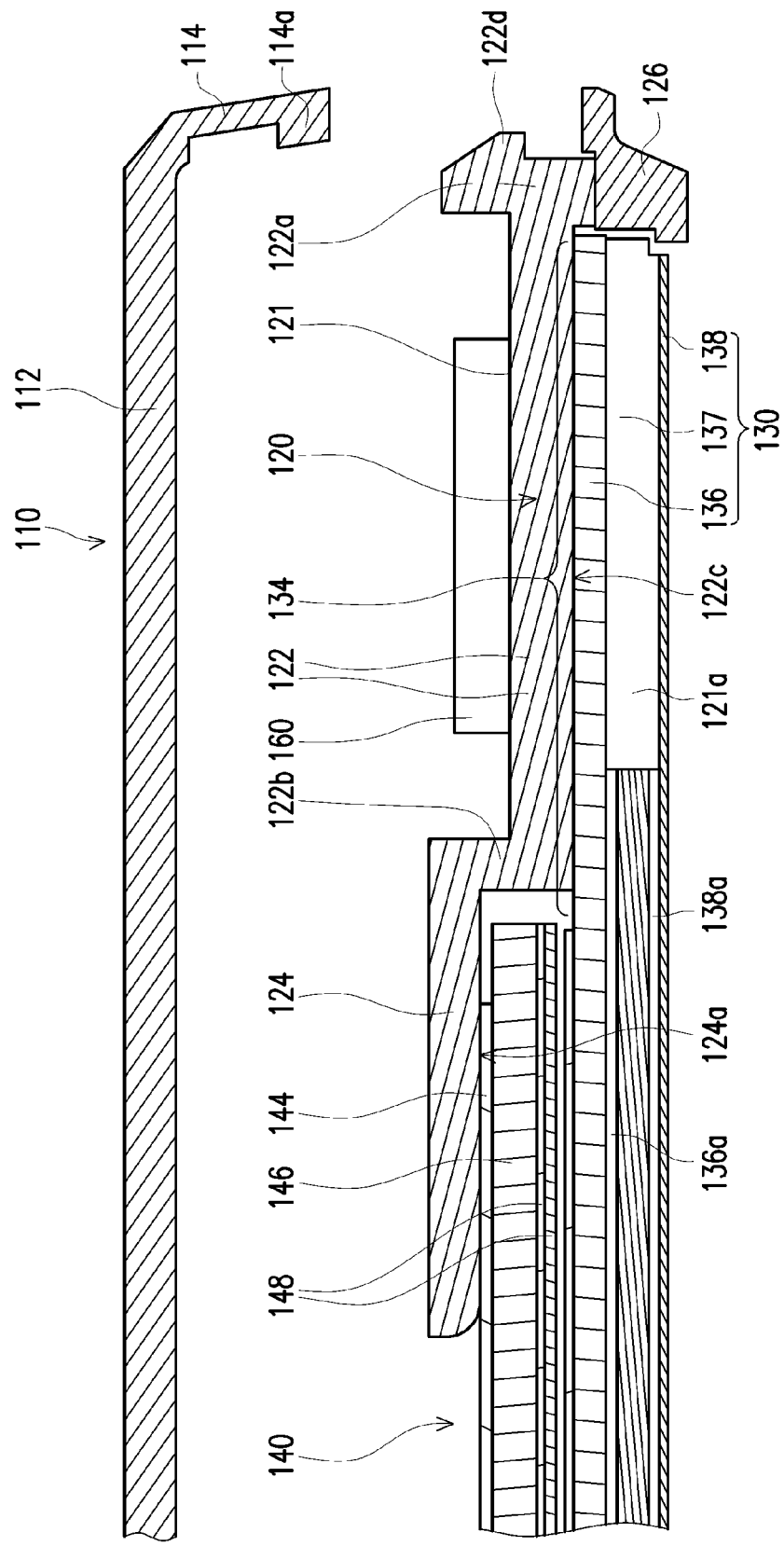
FIG. 5 illustrates the cover and the frame of FIG. 4 separated from each other.

Moreover, the sidewall 114 of the cover 110 of the first embodiment has a first fixing portion 114a, and the first supporting portion 122 of the frame 120 has a second fixing portion 122d, and the first fixing portion 114a is snapped to the second fixing portion 122d to fix the cover 110 to the frame 120. After the cover 110 is fixed to the frame 120 to form the display device 100, the cover 110 is adjacent to the second side of the panel module, and the cover 110 and the frame 120 all provide support to the panel module to strengthen a structural strength of the display module. After the cover 110 is fixed to the frame 120, the sidewall 114 of the cover 110 covers a sidewall of the corresponding frame 120 to avoid light leakage of the display device 100. FIG. 5 illustrates the cover and the frame of FIG. 4 separated from each other. Referring to FIG. 4 and FIG. 5, during assembling, the glass module 130 and the backlight module 140 are respectively adhered to the frame 120 as that shown in FIG. 5. Then, the first fixing portion 114a of the cover 110 is snapped to the second fixing portion 122d of the frame 120 to complete assembling the cover 110 and the frame 120 to form the display device 100.

Figure 6:
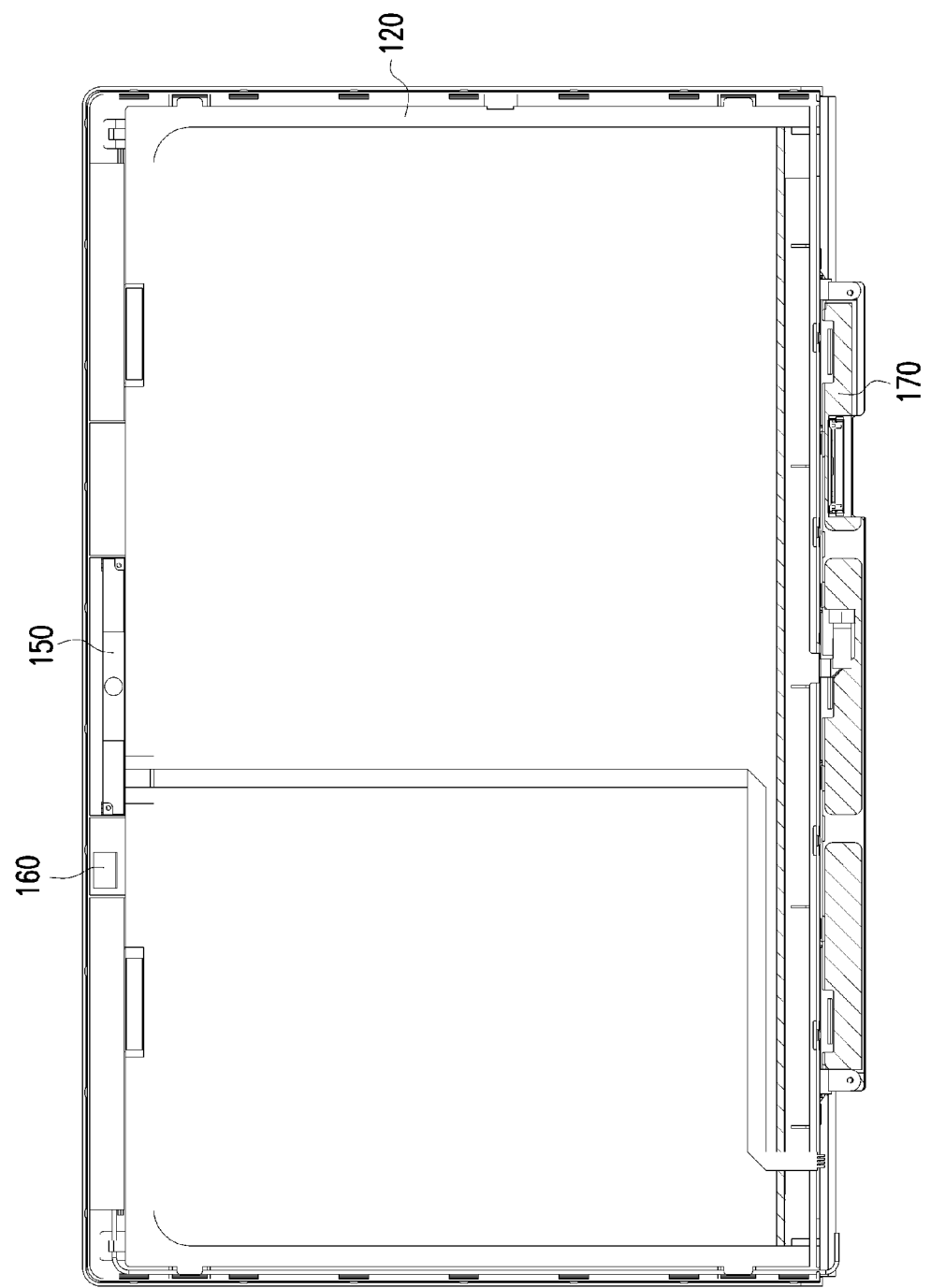
FIG. 6 is a front view of a frame of FIG. 3.

FIG. 6 is a front view of the frame of FIG. 3. Referring to FIG. 1, FIG. 3 and FIG. 6, the display device 100 of the first embodiment further includes an electronic component and a driving module plate 170. The electronic component is a camera module 150, an antenna 160 or a microphone, and the electronic component is disposed in an electronic component assembling area 121 on the second side of the frame 120. When the display device 100 includes a plurality of electronic components, the electronic components may include a camera module 150, an antenna 160, and a microphone. The driving module plate 170 is connected to the glass module 130 and is assembled to a lower edge of the frame 120, where the driving module plate 170 is electrically connected to the glass module 130 to drive the glass module 130 to display images. The electronic component assembling area 121 on the frame 120 is generally located at an upper edge of the frame 120 and is adjacent to the second side of the panel module to provide the user a better operation environment, where the upper edge of the frame 120 is an upper area of the frame 120 relative to the lower edge. The camera module 150 and the antenna 160 are connected to a host of the electronic device through connection wires for transmitting signals to the host for processing. The electronic component assembling area 121 on the frame 120 is an area on the frame 120 where the electronic component is installed. The display device 100 of the first embodiment further includes a trim cover 180 and a trim strip 190, the trim cover 180 covers the driving module plate 170 stretching out from a side edge of the frame 120, and the trim strip 190 covers a part of the glass module 130 and exposes the display region 132, so that the display device 100 may have a better appearance and the glass plate on the glass module 130 is protected, where the trim strip 190 can be snapped to the cover 110 or the frame 120 to fix a position of the trim strip 190 on the display device 100.

Figure 7:
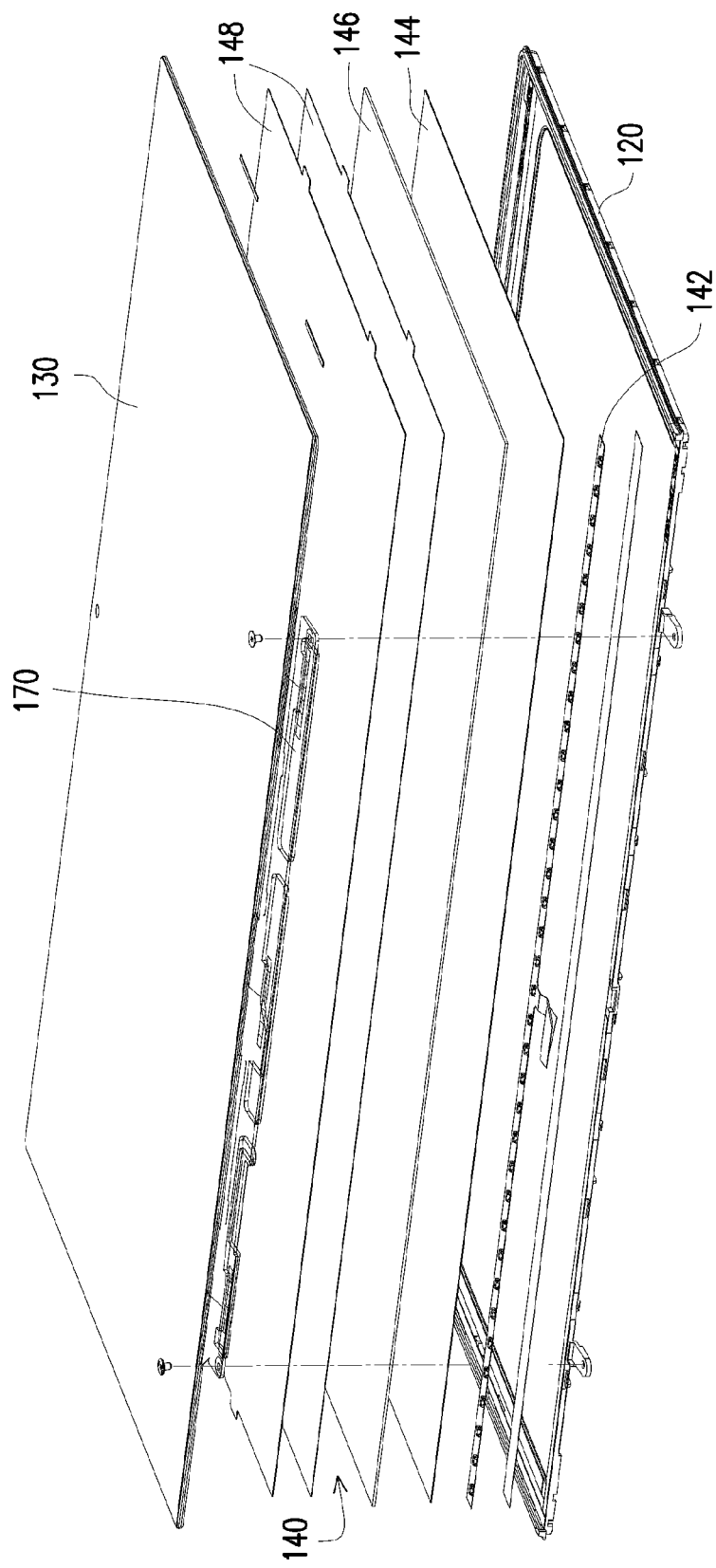
FIG. 7 is an exploded view of a part of members of the display device of FIG. 1.

FIG. 7 is an exploded view of a part of members of the display device of FIG. 1. Referring to FIG. 3, FIG. 4 and FIG. 7, the backlight module 140 of the first embodiment includes a light source 142, a reflector plate 144, a light guide plate 146 and an optical film set 148, where the light source 142 can be a lamp tube or a light-emitting diode (LED) lamp bar. The light source 142 and the reflector plate 144 are adhered to the second supporting portion 124 of the frame 120. The light guide plate 146 is disposed on the reflector plate 144, the optical film set 148 is disposed on the light guide plate 146, the light guide plate 146 is located between the reflector plate 144 and the optical film set 148, and the optical film set 148 is located between the light guide plate 146 and the glass module 130. One side of the light guide plate 146 is adjacent to the light source 142, and the light emitted form the light source 142 is suitable for entering the light guide plate 146 and is reflected by the reflector plate 144, and reaches the glass module 130 through the optical film set 148. The reflector plate 144, the light guide plate 146 and the optical film set 148 are optical components installed at the second side of the panel module.

Referring to FIG. 4, when the display device 100 having the backlight source is an LCD, the glass module 130 of the first embodiment includes a first glass plate 136, a liquid crystal layer 137 and a second glass plate 138. The first glass plate 136 is located at the second side of the panel module and is adhered to the first supporting portion 122, the liquid crystal layer 137 is disposed between the first glass plate 136 and the second glass plate 138. The second glass plate 138 is located at the first side of the panel module, and is used to contact the stop portion 126 or the trim strip 190. Materials of the first glass plate 136 and the second glass plate 138 are, for example, transparent materials with a high strength, which can protect the liquid crystal layer 137 injected there between, and the light emitted from the backlight module 140 reaches the liquid crystal layer 137 through the first glass plate 136, and after the light is processed, the user can view the image displayed by the display module through the second glass plate 138. In order to control images displayed at the display region 132 of the display module, the glass module 130 is required to contain an electro-conductive material, where a first electro-conductive layer 136a has to be formed on the surface of the first glass plate 136 and a second electro-conductive layer 138a has to be formed on the surface of the second glass plate 138 to control the liquid crystal layer 137 located between the first electro-conductive layer 136a and the second electro-conductive layer 138a. The electro-conductive material is the first electro-conductive layer 136a and the second electro-conductive layer 138a. The first electro-conductive layer 136a and the second electro-conductive layer 138a can be formed on the first glass plate 136 and the second glass plate 138 through sputtering or evaporation.

Generally, in a fabrication process of the glass module, a whole piece of the first glass plate and a whole piece of the second glass plate are first washed, and then a first electrode layer and a second electrode layer are respectively formed on the first glass plate and the second glass plate through processes of filming, photoresist coating, exposing, developing, etching and stripping, etc., where the first electrode layer includes a first electro-conductive layer, and the second electrode layer includes a second electro-conductive layer. A material of the first electro-conductive layer and the second electro-conductive layer can be metal, electro-conductive polymer, conductive metal ink, or conductive metal oxide. The conductive metal oxide is indium tin oxide (ITO), aluminium-doped zinc oxide (AZO), or zinc oxide (ZnO). Then, the glass having the electrode layers is processed though alignment layer forming, sealant printing, mounting & sealing, scribing & breaking, liquid crystal filling, polarizing film sticking, etc to form the glass module of the invention, where the mounting & sealing process is a process of heating and adhering the uncut first glass plate and the uncut second glass plate. Then, the glass module and the backlight module are adhered and fixed to the frame to form the display module.

After the display module is assembled, a part of the glass module 130 containing the first electro-conductive layer 136a and the second electro-conductive layer 138a is corresponded to the electronic component assembling area 121 on the frame 120 along a direction to form an electronic component projection area 121a, where the direction is a normal direction of the display region 132. If the antenna 160 is disposed on the electronic component assembling area 121, a signal receiving effect of the antenna 160 is influenced by the first electro-conductive layer 136a and the second electro-conductive layer 138a, and cannot pass a test specification. When the antenna 160 is a 3G antenna, the influence is highest. Therefore, in the present embodiment, the electronic component projection area 121a in the glass module 130 forms an approximate insulation area, and a resistance of a component in the electronic component projection area 121a is greater than $10^6$ ohm, so as to improve the signal receiving effect of the antenna 160. Therefore, the first electro-conductive layer 136a and the second electro-conductive layer 138a on the electronic component projection area 121a of the glass module 130 are required to be removed after the first electrode layer and the second electrode layer are formed on the surfaces of the whole piece of the first glass plate 136 and the whole piece of the second glass plate 138. According to the different design and process, when the first electro-conductive layer 136a and the second electro-conductive layer 138a are formed on the first glass plate 136 and the second glass plate 138, a mask is used to shield the electronic component projection area 121a, so that the first electro-conductive layer 136a and the second electro-conductive layer 138a are not formed on the electronic component projection area 121a. Furthermore, when the first electro-conductive layer 136a and the second electro-conductive layer 138a is conductive metal ink, the first electro-conductive layer 136a and the second electro-conductive layer 138a can be printed on the first glass plate 136 and the second glass plate 138 by using printing process. The printing figure can be controlled by software or screen printing process to create electro-conductive material region and non-electro-conductive material region on the glass module. Therefore, the electro-conductive material of the electronic component projection area is not printed when the electro-conductive material was printed on the glass module. After printing the electro-conductive material that is conductive metal ink on the glass module, the glass module needs to pass through a curing process to cure the conductive metal ink on the glass module. A method of removing the first electro-conductive layer 136a and the second electro-conductive layer 138a includes wet etching, dry etching, and/or laser ablation, though the invention is not limited thereto. After the first electro-conductive layer 136a and the second electro-conductive layer 138a in the electronic component projection area 121a are removed, the resistance of the component in the electronic component projection area 121a is greatly increased to form the approximate insulation area or an insulation area, so as to avoid the electro-conductive layer at the electronic component projection area 121a from influencing the performance of the electronic component.

Along with different product designs, the electronic component projection area 121a in the glass module 130 can be designed as one electronic component projection area 121a corresponds to a plurality of electronic component assembling area 121 on the frame 120, where the resistance of the component in the electronic component projection area 121a is greater than $10^6$ ohm. The electronic component projection area 121a in the glass module 130 can also be designed as one electronic component projection area 121a corresponds to one electronic component assembling area 121 on the frame 120, where the resistance of the component in the electronic component projection area 121a is greater than $10^6$ ohm, and an area of the electronic component projection area 121a is greater than a projection area of the electronic component assembling area 121 on the panel module. When the electronic component disposed at the electronic component assembling area 121 is an antenna, a distance between an edge of the projection area of the electronic component assembling area 121 along a projection direction and an edge of the electronic component projection area 121a on the panel module is greater than 5 mm, so that the antenna may have better performance. Along with different product designs, the liquid crystal layer 137 in the glass module 130 can be confined to be not appeared in the electronic component projection area 121a to reduce the cost of the display module. However, when the electronic component is a camera module, the liquid crystal layer 137 may also be appeared in the electronic component projection area 121a, so as to achieve a better imaging effect of the camera module.

When the display device 100 does not have the backlight source, the display module can achieve an even light emitting effect without the backlight module 140. When the display device 100 without the backlight source is an OLED display device, an organic light emitting layer is generally packaged in the glass module 130 to replace the liquid crystal layer, so that the panel module only includes the glass module 130, and the supporting part of the frame 120 only has one supporting portion to support the panel module. When the panel module is adhered to the supporting portion of the frame 120, the frame 120 is the only structure substantially providing support to the panel module. When the organic light emitting layer is generally packaged in the glass module 130 to replace the liquid crystal layer 137 and the backlight module 140, the organic light emitting layer in the glass module 130 can be confined to be not appeared in the electronic component projection area 121a to reduce the cost of the display module.

Figure 8:
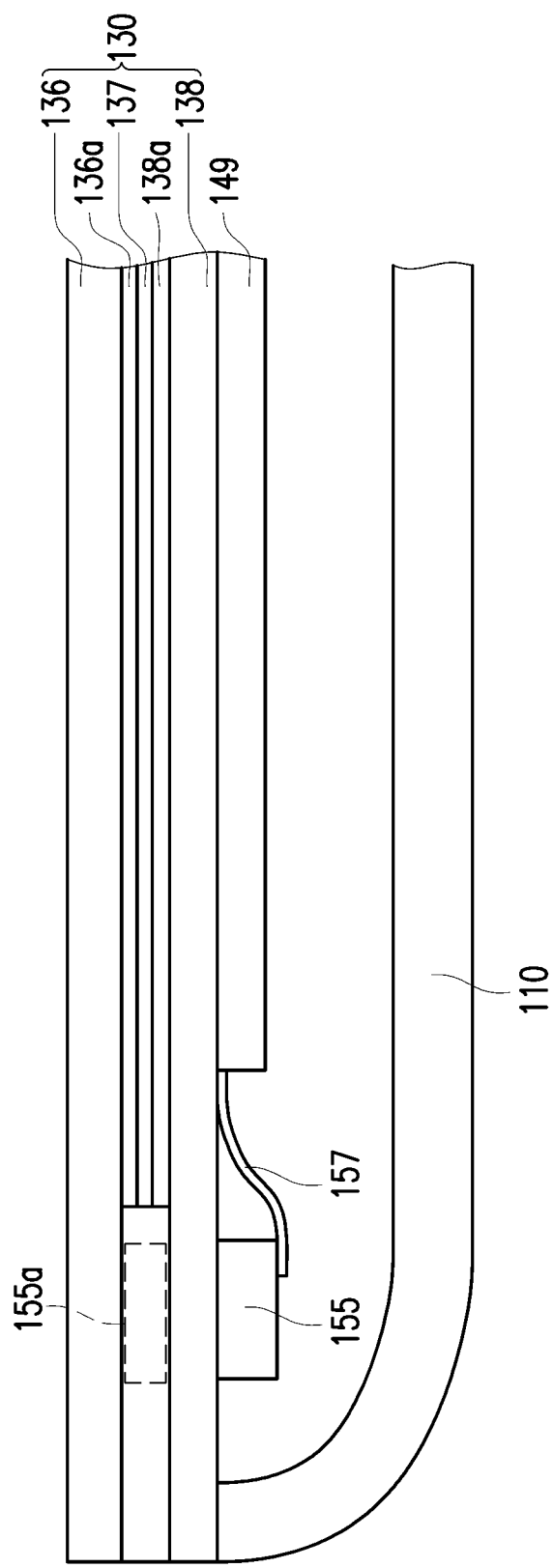
FIG. 8 is a cross-sectional view of a part of a display device according to a second embodiment of the invention.

Referring to FIG. 8, FIG. 8 is a cross-sectional view of a part of a display device according to a second embodiment of the invention. Similar to the first embodiment of FIG. 4, in the second embodiment, the first side of the panel module includes the glass module 130 and a display region (similar to the display region 132 of FIG. 1 to FIG. 3), and the glass module 130 can be directly fixed to the cover 110 or a carrying area (not shown) stretching out from the inner wall of the cover 110 to form the display device, where the cover 110 can substantially provide support to the panel module, and the size of the glass module 130 is not less than the size of the display region 132. The second side of the panel module includes a plurality of optical components 149. The glass module 130 includes the first glass plate 136, the second glass plate 138, the electro-conductive material and the liquid crystal layer, where the first glass plate 136 and the second glass plate 138 respectively have the first electro-conductive layer 136a and the second electro-conductive layer 138a, and the liquid crystal layer 137 is located between the first glass plate 136 and the second glass plate 138. The first electro-conductive layer 136a and the second electro-conductive layer 138a are the electro-conductive material in the glass module 130, and the electro-conductive material is metal, electro-conductive polymer, conductive metal ink, or conductive metal oxide. The conductive metal oxide is indium tin oxide (ITO), aluminium-doped zinc oxide (AZO), or zinc oxide (ZnO). In the second embodiment of the invention, an electronic component 155 is located on an outside surface of the glass module 130, or an electronic component 155a is directly installed in the glass module 130, where the electronic component 155/155a can be an antenna, a camera module or a microphone, etc., and the electronic component projection area is an area where the electronic component 155/155a is projected on the panel module along a normal direction of the display region. In order not to affect the performance of the electronic component 155/155a, the glass module 130 does not contain the electro-conductive material at the electronic component projection area, so as to maintain better performance of the electronic component 155. When the electronic component 155 is located over the glass module 130, the electronic component 155 can be connected to a power supply (not shown) through a wire 157, and the wire 157 can be located between the second glass plate 138 and the optical components 149. When the display device has the backlight source, the optical components 149 at the second side of the panel module include a reflector plate, a light guide plate and an optical film set, and the optical components 149 can be combined with a light source to form a backlight module. When the display device does not have the backlight source and is an OLED display device, the liquid crystal layer 137 in the glass module 130 is replaced by an organic light emitting layer, and the second side of the panel module may not include the optical components 149.

In summary, the display module of the invention includes an electronic component and a panel module, where the electronic component is disposed in the display module. The panel module includes a first side and a second side, and the first side includes a glass module having an electro-conductive material and a display region, wherein the glass module includes an electronic component projection area and the electronic component projection area does not contain the electro-conductive material to prevent affecting the performance of the electronic component. The electronic component projection area is an area where the electronic component is projected on the panel module along a normal direction of the display region. According to a design requirement of the product, the electronic component may be fixed to a frame combined with the panel module or located in the glass module.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display module, comprising:
an electronic component installed inside the display module;
a panel module comprising a first side and a second side, and the first side comprising a glass module having an electro-conductive material and a display region; and
a frame located between the glass module and the electronic component and supporting the glass module and the electronic component, wherein the electronic component is installed on the frame, a partial area of the glass module does not contain any electro-conductive material, and the partial area is an electronic component projection area on the panel module corresponding to the electronic component.

2. The display module as claimed in claim 1, wherein the electronic component is an antenna, a camera module, or a microphone.

3. The display module as claimed in claim 1, wherein the electronic component is disposed adjacent to the second side of the panel module or is located in the panel module.

4. The display module as claimed in claim 1, wherein when the display module has a backlight source, the second side of the panel module comprises a plurality of optical components, and the optical components comprise a reflector plate, a light guide plate and an optical film set, and the glass module contains a liquid crystal layer.

5. The display module as claimed in claim 4, wherein the electronic component projection area and the optical components are not overlapped on the panel module.

6. The display module as claimed in claim 1, wherein a size of the glass module is not smaller than a size of the display region.

7. The display module as claimed in claim 1, wherein when the display module does not have a backlight source, the glass module contains an organic light emitting layer.

8. The display module as claimed in claim 1, wherein the electronic component projection area is an area where the electronic component is projected on the panel module along a direction, and the direction is a normal direction of the display region.

9. The display module as claimed in claim 1, wherein the electro-conductive material is metal, electro-conductive polymer, conductive metal ink, or conductive metal oxide.

10. The display module as claimed in claim 1, wherein a resistance of a component in the electronic component projection area is greater than $10^6$ ohm.

11. The display module as claimed in claim 1, wherein the electro-conductive material of the electronic component projection area is removed through wet etching, dry etching, or laser ablation.

12. The display module as claimed in claim 1, wherein the glass module comprises a first glass plate and a second glass plate, and a surface of the first glass plate and a surface of the second glass plate contain the electro-conductive material.

13. The display module as claimed in claim 1, wherein the glass module is fixed to a first side of the frame, a second side of the frame comprises an electronic component assembling area for fixing the electronic component, and the frame is an only structure substantially providing support to the panel module.

14. The display module as claimed in claim 13, wherein the panel module covers the electronic component assembling area to form the electronic component projection area on the panel module, and the projection area of the electronic component assembling area is overlapped with the electronic component projection area on the panel module.

15. The display module as claimed in claim 13, wherein the display module is fixed to a cover through the frame, the display module and the cover are combined to form a display device, the cover is adjacent to the second side of the frame, and the electronic component fixed to the electronic component assembling area is located between the cover and the frame.

16. The display module as claimed in claim 15, wherein when the cover is fixed to the frame, a sidewall of the cover covers a sidewall of the frame to avoid light leakage of the display device.

17. The display module as claimed in claim 15, wherein the display device further comprises a trim strip located at periphery of the panel module for protecting the panel module, and a sidewall of the trim strip covers a sidewall of the frame to avoid light leakage of the display device.

18. The display module as claimed in claim 13, wherein the frame comprises a plurality of electronic component assembling areas, projections of the electronic component assembling areas along a direction are all covered by the electronic component projection area, and the direction is a normal direction of the display region.

19. The display module as claimed in claim 13, wherein a distance between an edge of the projection area of the electronic component assembling area along a projection direction and an edge of the electronic component projection area on the panel module is greater than 5 mm, and the projection direction is a normal direction of the display region.

20. The display module as claimed in claim 1, wherein the electro-conductive material of the electronic component projection area is not formed when the electro-conductive material was formed on the glass module.

* * * * *